US008986538B2

(12) United States Patent
Ishihara

(10) Patent No.: US 8,986,538 B2
(45) Date of Patent: Mar. 24, 2015

(54) CUTTING FLUID FILTERING DEVICE HAVING FILTER WASHING FUNCTION

(71) Applicant: Fanuc Corporation, Yamanashi (JP)

(72) Inventor: Mitsuyoshi Ishihara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 55 days.

(21) Appl. No.: 13/873,719

(22) Filed: Apr. 30, 2013

(65) Prior Publication Data

US 2013/0319919 A1 Dec. 5, 2013

(30) Foreign Application Priority Data

May 31, 2012 (JP) .................................. 2012-124725

(51) Int. Cl.
*B01D 29/62* (2006.01)
*B23Q 11/10* (2006.01)
*B01D 29/66* (2006.01)
*B01D 37/04* (2006.01)
*B01D 29/60* (2006.01)
*B01D 35/027* (2006.01)

(52) U.S. Cl.
CPC ............ *B01D 29/62* (2013.01); *B23Q 11/1069* (2013.01); *B01D 29/66* (2013.01); *B01D 37/045* (2013.01); *B01D 29/605* (2013.01); *B01D 35/027* (2013.01)
USPC .............. 210/86; 210/108; 210/139; 210/143

(58) Field of Classification Search
None
See application file for complete search history.

(56) References Cited

U.S. PATENT DOCUMENTS

2002/0121485 A1* 9/2002 Youngers ....................... 210/739
2007/0246405 A1* 10/2007 Pfeiffer ........................... 210/90

FOREIGN PATENT DOCUMENTS

| JP | 838828 A | 2/1996 |
|----|----|----|
| JP | 11253714 A | 9/1999 |
| JP | 200024421 A | 1/2000 |
| JP | 2001-252847 A | 9/2001 |
| JP | 200466425 A | 3/2004 |
| JP | 2005205303 A | 8/2005 |
| JP | 2006-255833 A | 9/2006 |
| JP | 2006-272474 A | 10/2006 |

OTHER PUBLICATIONS

Office Action mailed Jul. 2, 2013 corresponds to Japanese patent application No. 2012-124725.

* cited by examiner

*Primary Examiner* — Terry Cecil
(74) *Attorney, Agent, or Firm* — Lowe Hauptman & Ham, LLP

(57) ABSTRACT

A cutting fluid filtering device having a filter washing function drives a pump to supply a cutting fluid to a filter when the fluid level of a tank that stores the cutting fluid filtered by the filter becomes equal to or lower than a predetermined height. In addition, the cutting fluid filtering device issues an instruction to execute washing of the filter when the operation times of the pump are totalized and the total value becomes equal to or longer than a preset washing operation interval time of the filter.

6 Claims, 14 Drawing Sheets

CUTTING FLUID FILTERING DEVICE HAVING FILTER WASHING FUNCTION

RELATED APPLICATIONS

The present application is based on, and claims priority from, Japanese Application Number 2012-124725, filed May 31, 2012, the disclosure of which is hereby incorporated by reference herein in its entirety.

BACKGROUND OF THE INVENTION

1. Field of the Invention

The present invention relates to a cutting fluid filtering device used to remove a chip or sludge mixed in a cutting fluid in a machine tool.

2. Description of the Related Art

In a machine tool, impurities such as a chip and sludge generated during machining are mixed into a cutting fluid to adversely affect the performance and reliability of the machine tool, and hence a filter for removing the impurities is used. For the purpose of maintaining the purification performance and prolonging the life of the filter, the filter is washed. As a method for washing the filter, for example, as described in Japanese Patent Application Laid-open No. 2006-272474, Japanese Patent Application Laid-open No. 2006-255833, and Japanese Patent Application Laid-open No. 2001-252847, there are cases where backwashing in which the cutting fluid is flown in a direction reverse to the direction of flow of the cutting fluid during its normal use and the chip and sludge adhering to the filter are thereby removed is performed.

Herein, the outline of the backwashing will be described. First, inflow-side and outflow-side ducts of a container with a filter (filter container) subjected to the backwashing are closed such that the filter and the cutting fluid remaining in the filter container cannot move. Subsequently, by supplying compressed air into the filter in a direction reverse to the direction of flow of the cutting fluid during its normal use and opening a discharge valve of a discharge duct connected to the filter container, the cutting fluid pressurized by the supplied compressed air is caused to pass through the filter and flow into the opened discharge duct. By the flow of the cutting fluid, impurities adhering to the filter such as the chip and sludge are removed.

A description will be given of an example of a conventional cutting fluid filtering device of the machining tool by using FIG. 10.

The reference numeral 10 denotes a tank, the reference numeral 11 denotes a filter pump, the reference numeral 12 denotes a inflow-side valve, the reference numeral 13 denotes a filter container with a filter, the reference numeral 14 denotes a differential pressure switch, the reference numeral 15 denotes a discharge valve, the reference numeral 16 denotes an air source, the reference numeral 17 denotes an air supply valve, the reference numeral 18 denotes an outflow-side valve, the reference numeral 19 denotes a cutting fluid containing chips, and the reference numerals 20, 21, 22, and 23 denote ducts. The reference numeral 70 denotes a machine tool main body.

A cutting fluid filtering device 1 controlled by a controller (not shown) is caused to operate to drive the filter pump 11, the cutting fluid containing chips 19 is pumped up from the tank 10 through the duct 20 to be caused to pass through the filter container 13, and the cutting fluid filtered by the filter in the filter container 13 is supplied to the machining tool main body 70. The filter (not shown) for filtering out chips from the cutting fluid containing chips is attached in the filter container 13.

As the purification of the cutting fluid containing chips 19 stored in the tank 10 is continued, the amount of the chip adhering to the filter in the filter container 13 is gradually increased. As a result, a difference in pressure between the duct 21 on the side of inflow to the filter container 13 and the duct 22 on the side of outflow from the filter container 13 is gradually increased. When the pressure difference between the inflow-side duct 21 and the outflow-side duct 22 becomes not less than a preset pressure difference, the differential pressure switch 14 is activated and backwashing is started.

At the start of the backwashing, first, the drive of the filter pump 11 is stopped, the pumping of the cutting fluid containing chips 19 stored in the tank 10 is suspended, and the inflow-side duct 21 and the outflow-side duct 22 of the filter container 13 are closed using the inflow-side valve 12 and the outflow-side valve 18. With this, the cutting fluid remaining in the filter container 13 cannot flow out to the tank 10 or the machining tool main body 70.

Subsequently, the air supply valve 17 connected to the air source 16 is opened, and compressed air is supplied into the filter container 13 in a direction reverse to the direction of flow of the cutting fluid during its normal use. By closing the air supply valve 17 connected to the air source 16 and opening the discharge valve 15 connected to the filter container 13, the cutting fluid pressurized by the compressed air from the air source 16 is caused to pass through the filter in the filter container 13 in the direction reverse to the direction of flow of the cutting fluid during its normal use and return to the tank 10 through the duct 23. By the flow of the cutting fluid, the chip and sludge adhering to the filter are removed.

In the conventional art described above, a structure is adopted in which the differential pressure switch 14 attached to the filter from which the chip is to be removed is set so as to be activated when the predetermined pressure difference occurs, and the backwashing is performed with a signal from the differential pressure switch. Note that a pressure sensor can be used instead of the differential pressure switch 14.

SUMMARY OF THE INVENTION

In the conventional art described above, although it is determined whether or not the backwashing is performed on the basis of an output value obtained from the differential pressure switch 14 or the pressure sensor, these devices are expensive, and hence there is room for improvement in cost. Therefore, it is desirable that it can be determined whether or not the backwashing is performed by using a simple method or an inexpensive device.

In the conventional art described above, in order to change an interval (time) from the completion of the backwashing of the filter to the execution of the next backwashing thereof, it is necessary to change the pressure that activates the differential pressure switch 14, change the set value of the pressure difference at which the backwashing is performed, or change the value of a timer that sets a backwashing time interval, and the time of the backwashing is not automatically changed according to the degree of clogging of the filter. Further, although it is described that a time during which the compressed air is supplied during the backwashing is changed according to the degree of the clogging of the filter, no consideration is given to adjustment of the interval (time) from the completion of the backwashing of the filter to the execution of the next backwashing thereof.

If the interval time of the backwashing is automatically changed and the backwashing is performed at a necessary and sufficient frequency according to wide-ranging contents of machining and the life of the filter can be thereby prolonged while securing the cutting fluid required for the machining, it is possible to reduce a time and cost required to maintain the machine tool and shorten a time during which the machine tool is stopped for the maintenance.

Consequently, an object of the present invention is to provide a cutting fluid filtering device for filtering a cutting fluid of a machine tool that can automatically adjust the timing of washing of a filter used to remove impurities from the cutting fluid without using pressure detection means.

In order to achieve the above object, a cutting fluid filtering device according to the present invention includes a dirty tank that stores a cutting fluid used when a workpiece is machined by using a machine tool, a filter that filters out an impurity contained in the cutting fluid, a pump that supplies the cutting fluid to the filter, and a clean tank that stores the cutting fluid filtered by the filter, and has a filter washing function that washes off the impurity caught by the filter. Further, the cutting fluid filtering device includes a fluid level detector that detects a height of a fluid level of the cutting fluid stored in the clean tank, a pump control unit that drives the pump to supply the cutting fluid to the filter when the fluid level detector detects that the fluid level of the cutting fluid is not higher than a predetermined height, a pump operation time totalization unit that totalizes an operation time of the pump, and a washing instruction unit that compares a total time calculated in the pump operation time totalization unit with a preset washing operation interval time of the filter, and issues an instruction to execute washing of the filter when the total time becomes equal to or longer than the washing operation interval time.

The fluid level detector may be constituted of two detectors that detect a lower limit position and an upper limit position of the fluid level of the cutting fluid, and the pump control unit may drive the pump when it is detected that the fluid level of the cutting fluid is lower than the lower limit position and may stop the pump when it is detected that the fluid level of the cutting fluid is at the upper limit position.

The cutting fluid filtering device can further include a total time storage unit that stores the total time during which the pump is operated from completion of the washing of the filter to execution of the next washing, and a washing operation interval time adjustment unit that compares the total time newly calculated in the pump operation time totalization unit after the washing of the filter with the total time stored in the total time storage unit before the washing of the filter, and reduces the washing operation interval time of the filter when the newly calculated total time is longer than the total time before the washing of the filter and increases the washing operation interval time of the filter when the newly calculated total time is shorter than the total time before the washing of the filter.

The cutting fluid filtering device can further include a total time storage unit that stores the total time during which the pump is operated from completion of the washing of the filter to execution of the next washing, and a washing operation interval time adjustment unit that compares the total time newly calculated in the pump operation time totalization unit with an average value of the total times previously calculated a plurality of times in the pump operation time totalization unit, and reduces the washing operation interval time when the newly calculated total time is longer than the average value of the total times and increases the washing operation interval time when the newly calculated total time is shorter than the average value of the total times.

The fluid level detector may detect a lower limit position of the cutting fluid, and the pump control unit may drive the pump when the fluid level of the cutting fluid is lower than the lower limit position and may stop the pump after the pump is driven for a predetermined time.

The washing of the filter may be performed when a time during which the fluid level detected by the fluid level detector is not higher than a predetermined height becomes equal to or longer than a specific time.

The machine tool may be stopped when a time during which the fluid level detected by the fluid level detector is not higher than a predetermined height becomes equal to or longer than a specific time.

According to the present invention, it is possible to provide the cutting fluid filtering device for filtering the cutting fluid of the machine tool that can automatically adjust the timing of the washing of the filter used to remove impurities from the cutting fluid without using the pressure detection means.

BRIEF DESCRIPTION OF THE DRAWINGS

The above and other objects and novel features of the present invention will become apparent from the following description of preferred embodiments given in conjunction with the accompanying drawings, in which.

DESCRIPTION OF THE PREFERRED EMBODIMENTS

Figure 1:
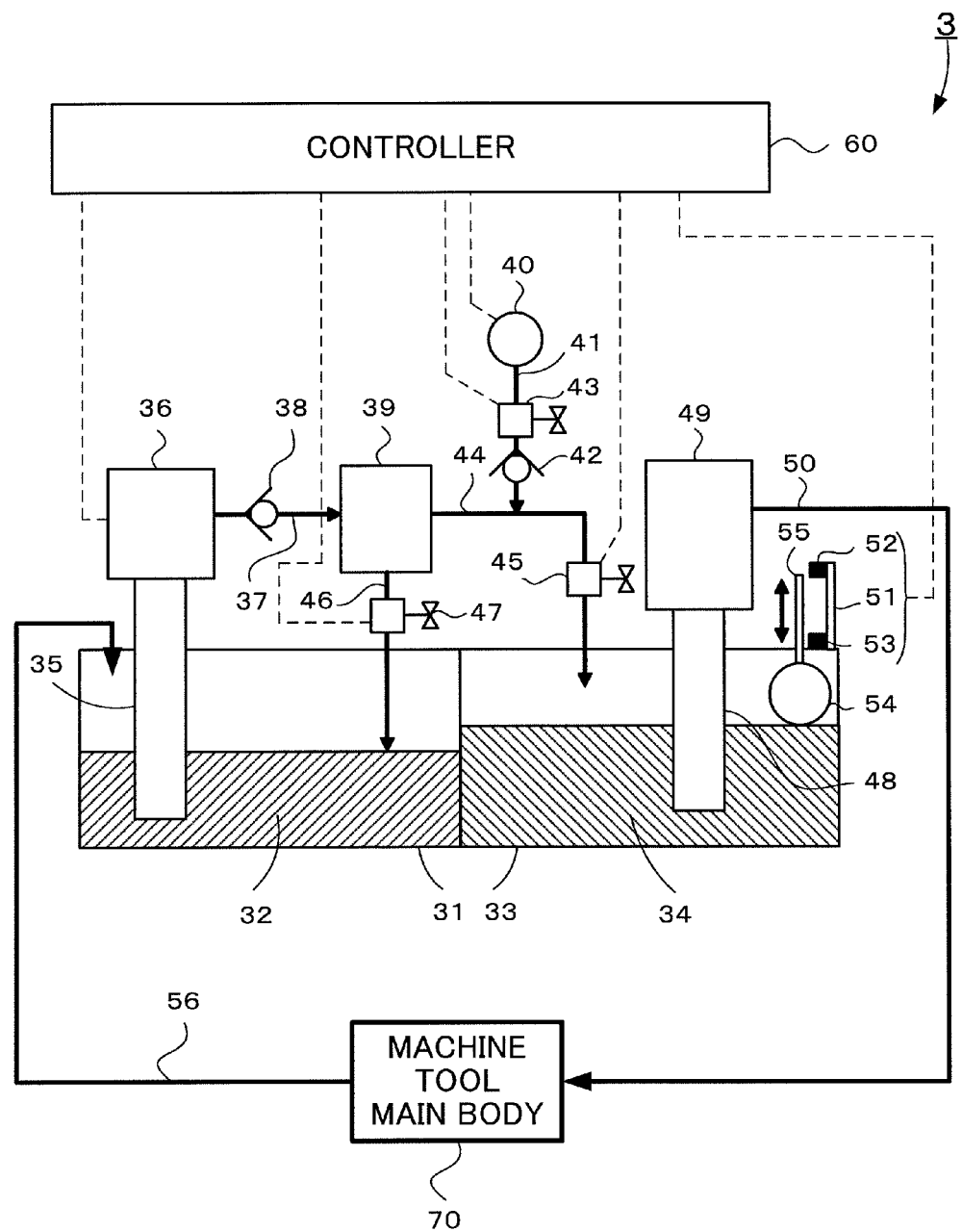
FIG. 1 is a view illustrating an embodiment of a cutting fluid filtering device according to the present invention.

A description will be given of an embodiment of a cutting fluid filtering device according to the present invention by using FIG. 1.

The reference numeral 3 denotes a cutting fluid filtering device, the reference numeral 31 denotes a dirty tank, the reference numeral 32 denotes a cutting fluid containing chips, the reference numeral 33 denotes a clean tank, the reference numeral 34 denotes a purified cutting fluid, the reference numeral 35 denotes a duct, the reference numeral 36 denotes a filter pump, the reference numeral 37 denotes a duct, the reference numeral 38 denotes a check valve, the reference numeral 39 denotes a filter container in which a filter (not shown) for removing an impurity from a cutting fluid containing the impurity is attached, the reference numeral 40 denotes an air source, the reference numeral 41 denotes a duct, the reference numeral 42 denotes a check valve, the reference numeral 43 denotes an air supply valve, the reference numeral 44 denotes a duct, the reference numeral 45 denotes an outflow-side valve, the reference numeral 46 denotes a duct, the reference numeral 47 denotes a discharge valve, the reference numeral 48 denotes a duct, the reference numeral 49 denotes a pump, the reference numeral 50 denotes a duct, the reference numeral 51 denotes a sensor support member, the reference numeral 52 denotes an upper limit detection proximity sensor, the reference numeral 53 denotes a lower limit detection proximity sensor, the reference numeral 54 denotes a floating ball, the reference numeral 55 denotes a fluid level detection rod, the reference numeral 56 denotes a duct, the reference numeral 60 denotes a controller that generally controls the cutting fluid filtering device 3, and the reference numeral 70 denotes a machine tool main body. Note that the function of the controller 60 may be incorporated into a numerical controller (not shown) that controls the machine tool main body 70.

The machine tool main body 70 is controlled by a controller for the machine tool (not shown), and machines a workpiece (not shown). The pump 49 is controlled by the controller for the machine tool mentioned above, and supplies the cutting fluid (the filtered cutting fluid 34) stored in the clean tank 33 to the machine tool main body 70 via the duct 50. The used cutting fluid discharged from the machine tool main body 70 is collected into the dirty tank 31 via the duct 56.

The controller 60 of the cutting fluid filtering device 3 performs the drive control of the filter pump 36 and the air source 40 and the opening/closing control of the air supply valve 43, the outflow-side valve 45, and the discharge valve 47, and inputs detection signals outputted from the upper limit detection proximity sensor 52 and the lower limit detection proximity sensor 53 therein to obtain information on the fluid level height of the filtered cutting fluid stored in the clean tank 33.

First, a description will be given of filtering of the cutting fluid containing the impurity by the cutting fluid filtering device 3.

The clean tank 33 and the dirty tank 31 are completely independent of each other. The cutting fluid collected from the machine tool main body 70 via the duct 56 is stored in the dirty tank 31. The impurities such as the chip and sludge are mixed in the cutting fluid collected from the machine tool main body 70. The filter pump 36 pumps up the cutting fluid containing the impurity 32 stored in the dirty tank 31 via the duct 35 and supplies the cutting fluid 32 to the filter container 39 via the duct 37. In the filter container 39, the filter for removing the impurity (the chip or the sludge) mixed in the cutting fluid is attached.

The filter container 39 includes an inlet into which the cutting fluid containing the impurity 32 supplied from the filter pump 36 flows, an outlet from which the cutting fluid filtered by the filter flows into the clean tank 33, and the discharge valve 47 for discharging the cutting fluid to the dirty tank 31. When the cutting fluid containing the impurity is filtered by the filter of the filter container 39, the outflow-side valve 45 is controlled to be opened, while the discharge valve 47 is controlled to be closed. The check valve 38 is disposed at some midpoint of the duct 37 connecting the filter pump 36 and the filter container 39. The check valve 38 is for preventing the flow (backflow) of the cutting fluid and compressed air (described later) from the filter container 39 toward the filter pump 36.

The outflow-side valve 45 is provided at some midpoint of the duct 44 connected to the outlet of the filter container 39. In addition, the duct 41 extending from the air source 40 is connected to the duct 44 between the outlet of the filter container 39 and the outflow-side valve 45. The duct 41 is provided with the check valve 42 and the air supply valve 43. The check valve 42 is for preventing the flow (backflow) of the compressed air and the cutting fluid from the filter container 39 toward the air source 40. Note that the air supply valve 43 is closed when the cutting fluid containing the impurity is filtered by driving the filter pump 36.

The cutting fluid containing the impurity such as the chip or the sludge is pumped up from the dirty tank 31 using the filter pump 36, supplied into the filter container 39, and discharged into the clean tank 33 after the impurity thereof is removed by the filter in the filter container 39. In the clean tank 33, there are disposed the upper limit detection proximity sensor 52 and the lower limit detection proximity sensor 53 as the proximity sensors for detecting the upper limit and the lower limit of the fluid level height of the cutting fluid. The upper limit detection proximity sensor 52 and the lower limit detection proximity sensor 53 are attached to the sensor support member 51, and the sensor support member 51 is fixed at a predetermined position of the clean tank 33. The floating ball having the fluid level detection rod 55 attached thereto is placed on the filtered cutting fluid 34 in the clean tank 33. As the upper limit detection proximity sensor 52 and the lower limit detection proximity sensor 53, known sensors such as optical, magnetic, and electric sensors can be used.

When the fluid level of the filtered cutting fluid 34 in the clean tank 33 lowers and the lower limit detection proximity sensor 53 reacts to the lowering, the filter pump 36 is operated on the basis of the detection output of the lower limit detection proximity sensor 53 to pump up the cutting fluid containing the impurity 32 and start to discharge the cutting fluid filtered by the filter in the filter container 39 into the clean tank 33. The discharge of the filtered cutting fluid into the clean tank 33 is continued until the fluid level of the filtered cutting fluid 34 in the clean tank 33 rises and the upper limit detection proximity sensor 52 reacts to the rise. When the upper limit detection proximity sensor 52 reacts thereto, the filter pump 36 is stopped.

As described above, the cutting fluid filtering device 3 shown in FIG. 1 uses the filter in order to remove the impurities (the chip and the sludge) mixed in the cutting fluid supplied to the machine tool main body 70. In addition, for the purpose of maintaining the performance of the filter and prolonging the life thereof, a washing operation (backwashing) is performed on the filter, and the chip and the sludge adhering to the filter are thereby removed.

In order to perform the backwashing, first, the inflow-side and outflow-side ducts of the filter container 39 to which the filter to be washed is attached are closed using the valves such that the cutting fluid remaining in the filter container 39 cannot move. Subsequently, the air supply valve 43 connected to the air source 40 is opened, and the compressed air is supplied into the filter container 39 in a direction reverse to the direction of flow of the cutting fluid during its normal use. Then, the air supply valve 43 connected to the air source 40 is closed and the discharge valve 47 attached to some midpoint of the duct connected to the filter container 39 is opened. So, the cutting fluid pressurized by the compressed air passes through the filter container 39 in the direction reverse to the direction of flow of the cutting fluid during its normal use, passes through the discharge valve 47, and returns to the dirty tank 31. By the flow of the cutting fluid, it is possible to remove the impurities such as the chip and the sludge adhering to the filter.

A description will be given of an example of the operation of the cutting fluid filtering device of FIG. 1 by using the timing chart of FIG. 2.

A time to (n=0, 1, 2, . . . ) from the reaction of the lower limit detection proximity sensor 53 of FIG. 1 to the reaction of the upper limit detection proximity sensor 52 corresponds to a time of the operation of the filter pump 36.

The total sum of the time of the operation of the filter pump 36 (a total operation time t) from the completion of backwashing of the filter to the execution of the next backwashing of the filter is represented by the following expression:

$$t = t0 + t1 + t2 \ldots$$

The controller 60 is capable of storing the present and past total operation time t and drive times t0, t1, t2, . . . , in accordance with predetermination.

Herein, a time from the completion of the washing of the filter in the filter container 39 to the execution of the next washing (a washing operation interval time) is assumed to be α, and α is preset in the controller 60. First, as a method for simply determining whether or not the next filter washing operation is performed, the controller 60 constantly compares the total operation time t of the filter pump 36 with the value of the set washing operation interval time α, and executes the washing when t becomes equal to or more than α. In the example of FIG. 2, at the time point when the operation times of the filter pump 36 t1, t2, and t3 are totalized, the total value t (=t0+t1+t2+t3) is equal to or more than preset α (t≥α), and hence the controller 60 issues a filter washing operation instruction.

Figure 2:
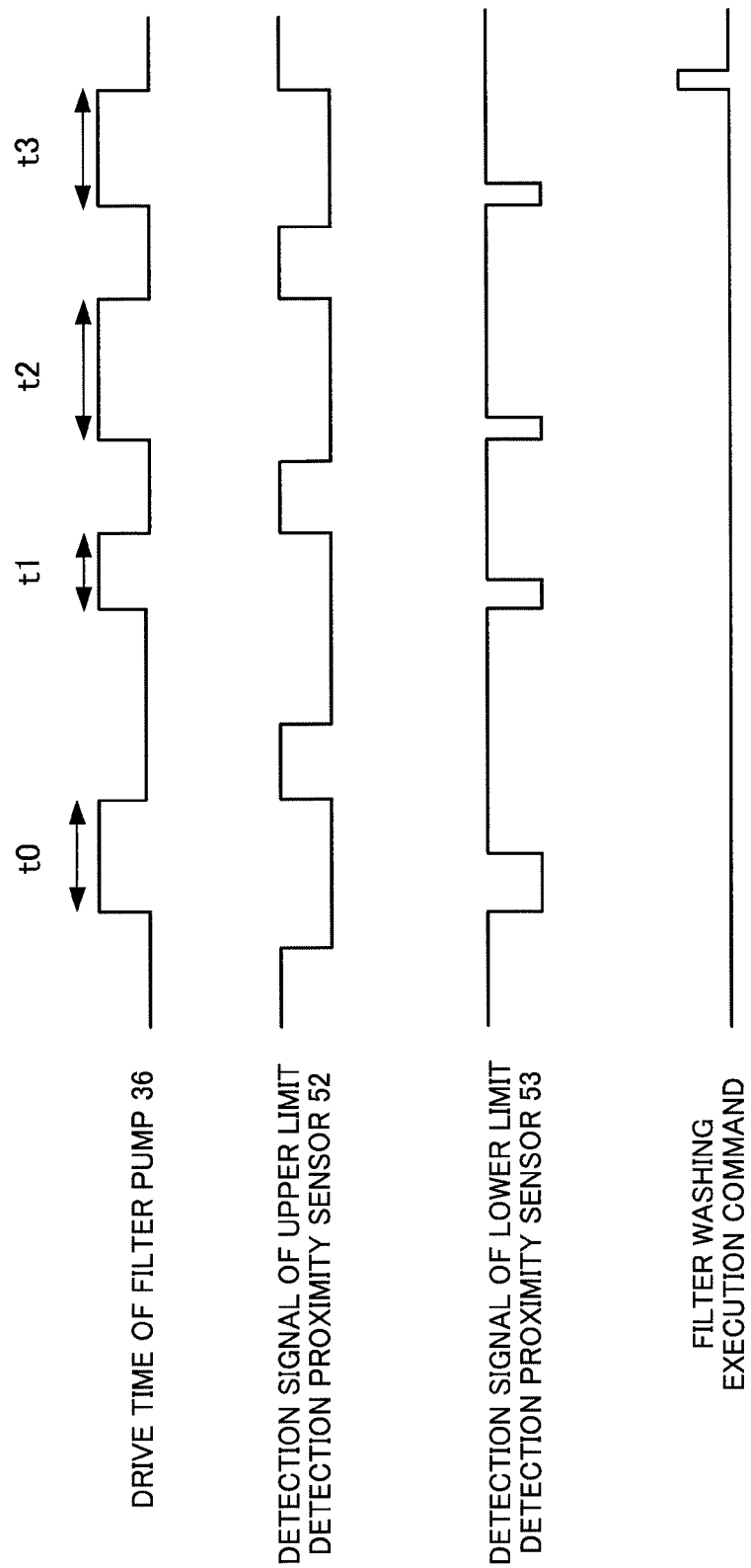
FIG. 2 is a timing chart illustrating an example of the operation of the cutting fluid filtering device of FIG. 1.

In FIG. 2, when "the detection signal of the upper limit detection proximity sensor 52" is at a high level (when the detection signal is in an ON state), the fluid level height of the filtered cutting fluid 34 stored in the clean tank 33 is not lower than the upper limit, while when "the detection signal of the upper limit detection proximity sensor 52" is at a low level (when the detection signal is in an OFF state), the fluid level height of the filtered cutting fluid 34 stored in the clean tank 33 is lower than the upper limit.

On the other hand, when "the detection signal of the lower limit detection proximity sensor 53" is at the high level (when the detection signal is in the ON state), the fluid level height of the filtered cutting fluid 34 stored in the clean tank 33 is not lower than the lower limit, while when "the detection signal of the lower limit detection proximity sensor 53" is at the low level (when the detection signal is in the OFF state), the fluid level height of the filtered cutting fluid 34 stored in the clean tank 33 is lower than the lower limit.

In the cutting fluid filtering device 3 of FIG. 1, the filter pump 36 is driven when the fluid level of the filtered cutting fluid 34 stored in the clean tank 33 is not lower than the lower limit position and not higher than the upper limit position, and the filtering of the cutting fluid containing the impurities stored in the dirty tank 31 is executed.

In this method, it is not necessary to provide pressure detection means such as a pressure switch or the like in the inflow-side and outflow-side ducts of the filter container 39, and it is possible to determine whether or not the backwashing of the filter is to be performed based on the total value obtained by totalizing the operation times of the filter pump 36. Note that the backwashing can be performed only during the operation of the machine tool or under other conditions.

Next, a description will be given hereinbelow of a method for automatically changing the washing operation interval time.

The controller 60 calculates a new washing operation interval time α' by using, among the total operation times, values of a current total operation time Tb of the filter pump 36 and a past total operation time Ta stored in the controller 60 according to the following expression, and applies α' at an arbitrary point of time:

$$\alpha' = (Ta/Tb) \times \alpha.$$

Consequently, in a case where the current total operation time Tb is longer than the past total operation time Ta stored in the controller 60, α' is smaller than α and, as a result, the subsequent washing operation interval time is reduced. On the other hand, in a case where the current total operation time Tb is shorter than the past total operation time Ta stored in the controller 60, α' is larger than α and, as a result, the subsequent washing operation interval time is increased. With the foregoing arrangement, it is possible to automatically adjust the washing operation interval time according to the total operation time t during which the filter pump 36 is operated.

In this case as well, the washing of the filter can be performed only during the operation of the machine tool or under other conditions. In addition, it is also possible to limit the value of the new washing operation interval time α' calculated based on the washing operation interval time α within a specific range, set the washing operation interval time α to a constant value, and determine the total operation time t of the filter pump 36 by averaging a plurality of past data items.

As other control related to the washing, in a case where the upper limit detection proximity sensor 52 does not react even when a time set based on a parameter elapses after the lower limit detection proximity sensor 53 reacts and the operation of the filter pump 36 is started, the washing may be forcibly executed. In addition, after the forcible washing, in a case where the lower limit or upper limit detection proximity sensor does not react even after the lapse of the time set based on the parameter since the filter pump 36 is operated again, it is possible to stop the operation of the machine tool.

Further, an arrangement may be adopted in which only the lower limit detection proximity sensor 53 is provided without the upper limit detection proximity sensor 52, the filter pump 36 is operated to start the supply of the filtered cutting fluid 34 into the clean tank 33 from the dirty tank 31 when the fluid level in the clean tank 33 lowers and the lower limit detection proximity sensor 53 reacts to the lowering, and the filter pump 36 is stopped after the lapse of a specific time since the reaction of the lower limit detection proximity sensor 53.

The present invention can be applied to a case where the filter container in the cutting fluid filtering device includes only the filter that performs filtering of the cutting fluid containing the impurities and a case where the filter that performs the filtering and a line filter that does not perform the filtering are combined in the filter container in the cutting fluid filtering device.

Hereinbelow, a description will be given of several examples of the process of executing the washing (backwashing) of the filter attached to the filter container 39 in the cutting fluid filtering device shown in FIG. 1 by using flowcharts.

<First Example of Filter Washing>

Figure 3:
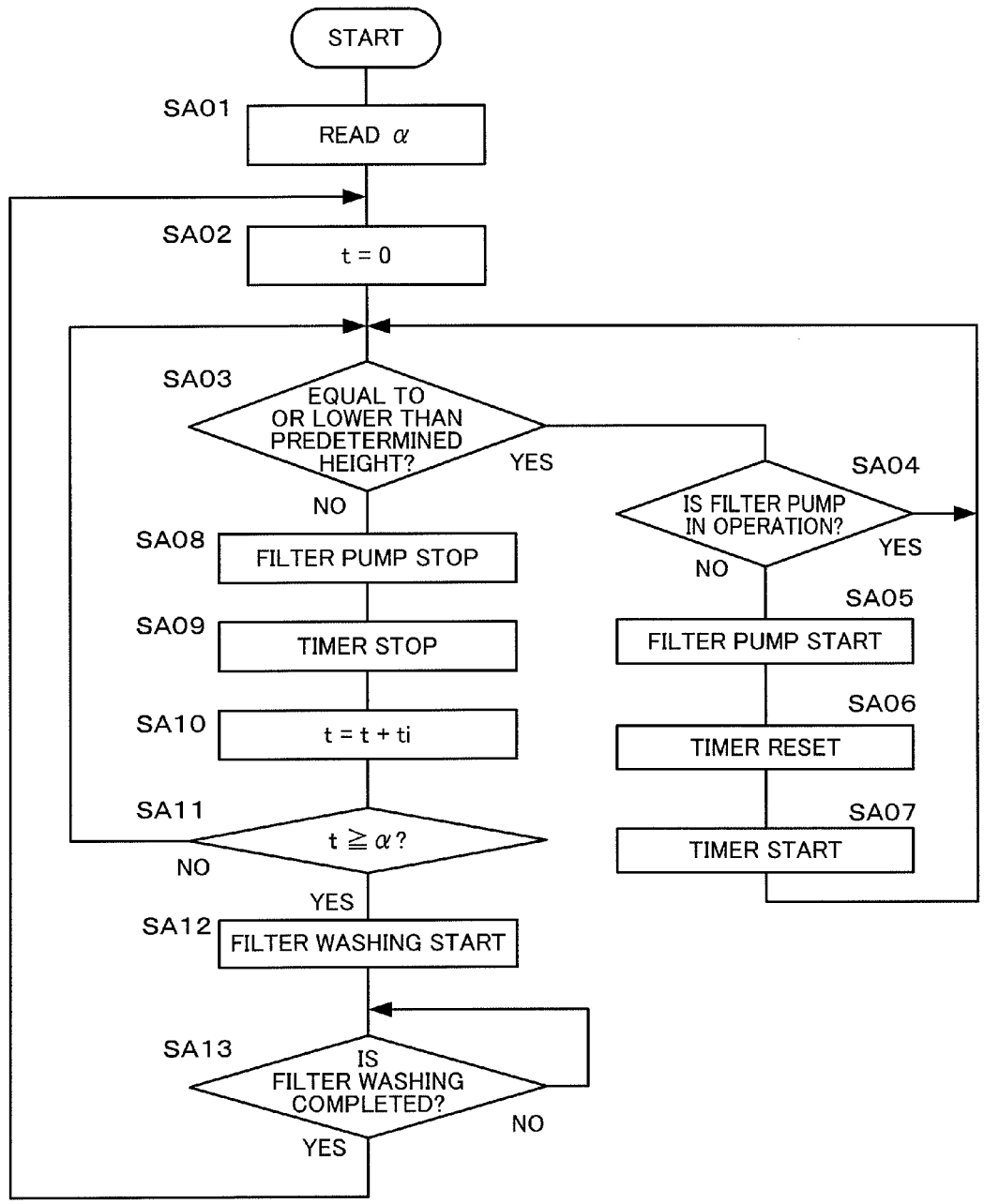
FIG. 3 is a flowchart showing a first example of a process of executing washing of a filter attached to a filter container in the cutting fluid filtering device shown in FIG. 1.

FIG. 3 is a flowchart showing a first example of the process of executing the washing of the filter attached to the filter container in the cutting fluid filtering device shown in FIG. 1.

In the example of the process, the fluid level height of the filtered cutting fluid in the clean tank 33 in the cutting fluid filtering device 3 is detected by one proximity sensor. Hereinbelow, a description will be given according to the following steps.

[Step SA01] The preset washing operation interval time α of the filter is read.

[Step SA02] The initial value of the total operation time t indicative of the value obtained by totalizing times during which the filter pump is driven is set to 0.

[Step SA03] It is determined whether or not the fluid level of the filtered cutting fluid in the clean tank is not higher than a predetermined height and, when the fluid level thereof is not higher than the predetermined height (YES), the process proceeds to Step SA04 and, when the fluid level thereof is higher than the predetermined height (NO), the process proceeds to Step SA08.

[Step SA04] It is determined whether or not the filter pump is in operation and, when the filter pump is in operation (YES), the process returns to Step SA03 and, when the filter pump is not in operation (NO), the process proceeds to Step SA05.

[Step SA05] The filter pump is activated.

[Step SA06] A timer that measures the drive time of the filter pump is reset.

[Step SA07] The timer is turned on and the process returns to Step SA03.

[Step SA08] It is determined in Step SA03 that the fluid level of the filtered cutting fluid is higher than the predetermined height, and hence the filter pump is stopped.

[Step SA09] The timer is turned off.

[Step SA10] The total operation time t is updated by adding a time ti measured by the timer that measures the drive time of the filter pump to the total operation time t. The time ti measured by the timer corresponds to a time from the activation of the filter pump in Step SA05 to the stop of the filter pump in Step SA08.

[Step SA11] It is determined whether or not the total operation time t of the filter pump updated (accumulated) in Step SA10 is not shorter than the preset washing operation interval time α of the filter (i.e., t≥α is satisfied) and, when the total operation time t is equal to or longer than the washing operation interval time α (YES), the process proceeds to Step SA12 and, when the total operation time t is shorter than the washing operation interval time α (NO), the process returns to Step SA03.

[Step SA12] Filter washing is started.

[Step SA13] It is determined whether or not the filter washing is completed, and the process returns to Step SA02 after the completion of the filter washing.

<Second Example of Filter Washing>

Figure 4:
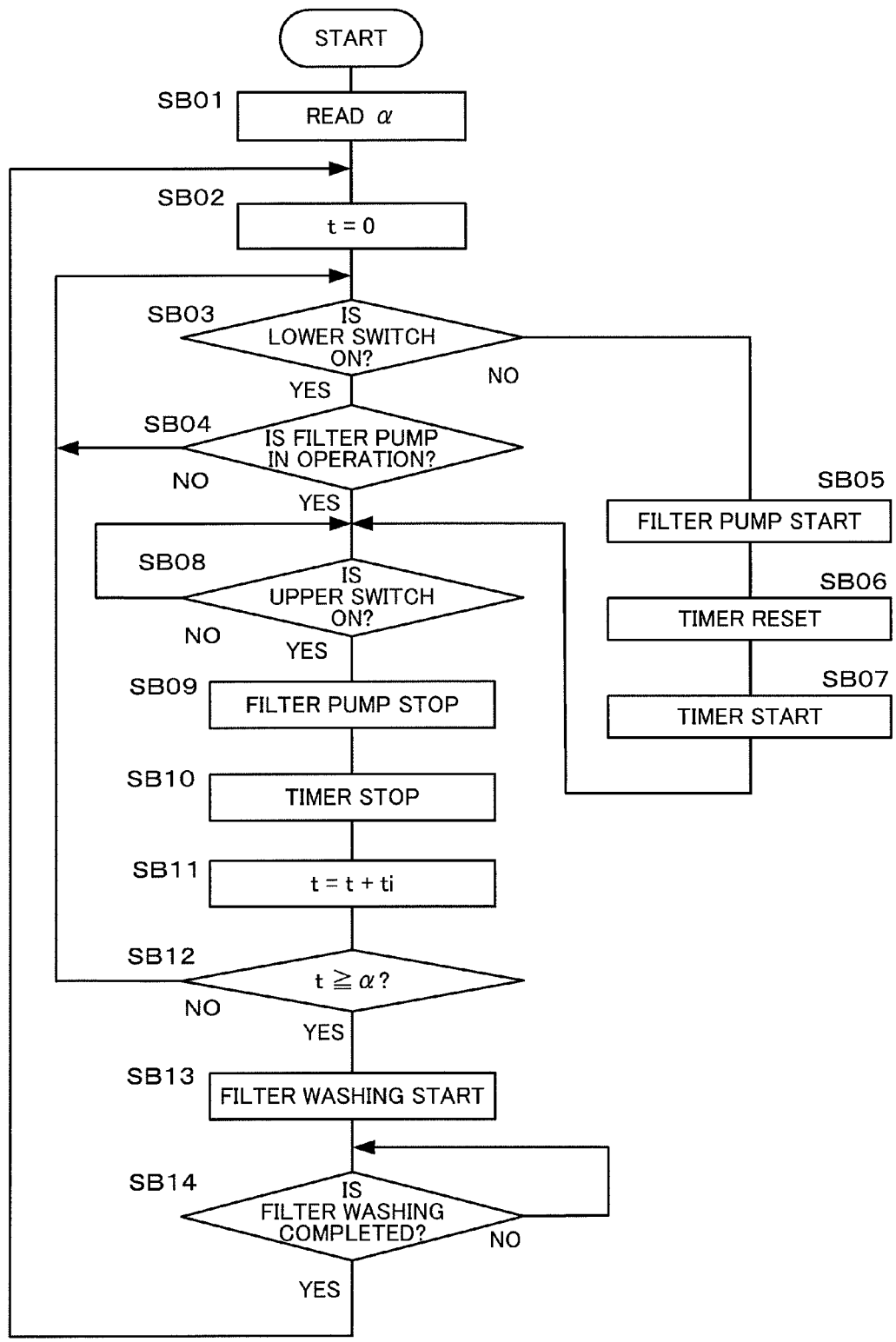
FIG. 4 is a flowchart showing a second example of the process of executing the washing of the filter attached to the filter container in the cutting fluid filtering device shown in FIG. 1.

FIG. 4 is a flowchart showing a second example of the process of executing the washing of the filter attached to the filter container in the cutting fluid filtering device shown in FIG. 1. In the example of the process, the fluid level height of the filtered cutting fluid in the clean tank 33 in the cutting fluid filtering device 3 is detected by using two proximity sensors of the upper limit detection proximity sensor 52 and the lower limit detection proximity sensor 53. The upper limit fluid level height is detected by the upper limit detection proximity sensor 52, while the lower limit fluid level height is detected by the lower limit detection proximity sensor 53. Hereinbelow, a description will be given according to the following steps.

[Step SB01] The preset washing operation interval time α of the filter is read.

[Step SB02] The initial value of the total operation time t indicative of the value obtained by totalizing the times during which the filter pump is driven is set to 0.

[Step SB03] It is determined whether or not the lower limit detection proximity sensor 53 (lower switch) is on due to the fluid level height of the filtered cutting fluid in the clean tank and, when the lower switch is on (YES), the process proceeds to Step SB04 and, when the lower switch is off (NO), the process proceeds to Step SB05.

[Step SB04] It is determined whether or not the filter pump is in operation and, when the filter pump is in operation (YES), the process proceeds to Step SB08 and, when the filter pump is not in operation (NO), the process returns to Step SB03.

[Step SB05] The filter pump is activated.

[Step SB06] The timer that measures the drive time of the filter pump is reset.

[Step SB07] The timer is turned on and the process proceeds to Step SB08.

[Step SB08] It is determined whether or not the upper limit detection proximity sensor 52 (upper switch) is on due to the fluid level height of the filtered cutting fluid in the clean tank and, when the upper switch is on (YES), the process proceeds to Step SB09 and, when the upper switch is off (NO), the process stands by until the upper limit detection proximity sensor 52 is turned on.

[Step SB09] The filter pump is stopped.

[Step SB10] The timer is turned off.

[Step SB11] The total operation time t is updated by adding the time ti measured by the timer that measures the drive time of the filter pump to the total operation time t. The time ti measured by the timer corresponds to the time from the activation of the filter pump in Step SB05 to the stop of the filter pump in Step SB09.

[Step SB12] It is determined whether or not the total operation time t of the filter pump updated (accumulated) in Step SB11 is not shorter than the preset washing operation interval time α of the filter (i.e., t≥α is satisfied) and, when the total operation time t is equal to or longer than the washing operation interval time α (YES), the process proceeds to Step SB13 and, when the total operation time t is shorter than the washing operation interval time a (NO), the process returns to Step SB03.

[Step SB13] The filter washing is started.

[Step SB14] It is determined whether or not the filter washing is completed, and the process returns to Step SB02 after the completion of the filter washing.

A supplementary description will be given of the above flowchart. A motor activation flag is turned on by the activation of the filter pump in Step SB05, and the motor activation flag is turned off in Step SB09. The determination of whether or not the filter pump is in operation in Step SB04 can be made based on the state of the motor activation flag. With this arrangement, no problem arises even when the operation of the cutting fluid filtering device 3 is started in a state where the fluid level position of the filtered cutting fluid 34 in the clean tank 33 is above the upper limit position or between the lower limit position and the upper limit position. The motor activation flag is used in other flowcharts. Note that the motor activation flag is off in its initial setting.

<Third Example of Filter Washing>

Figure 5A:
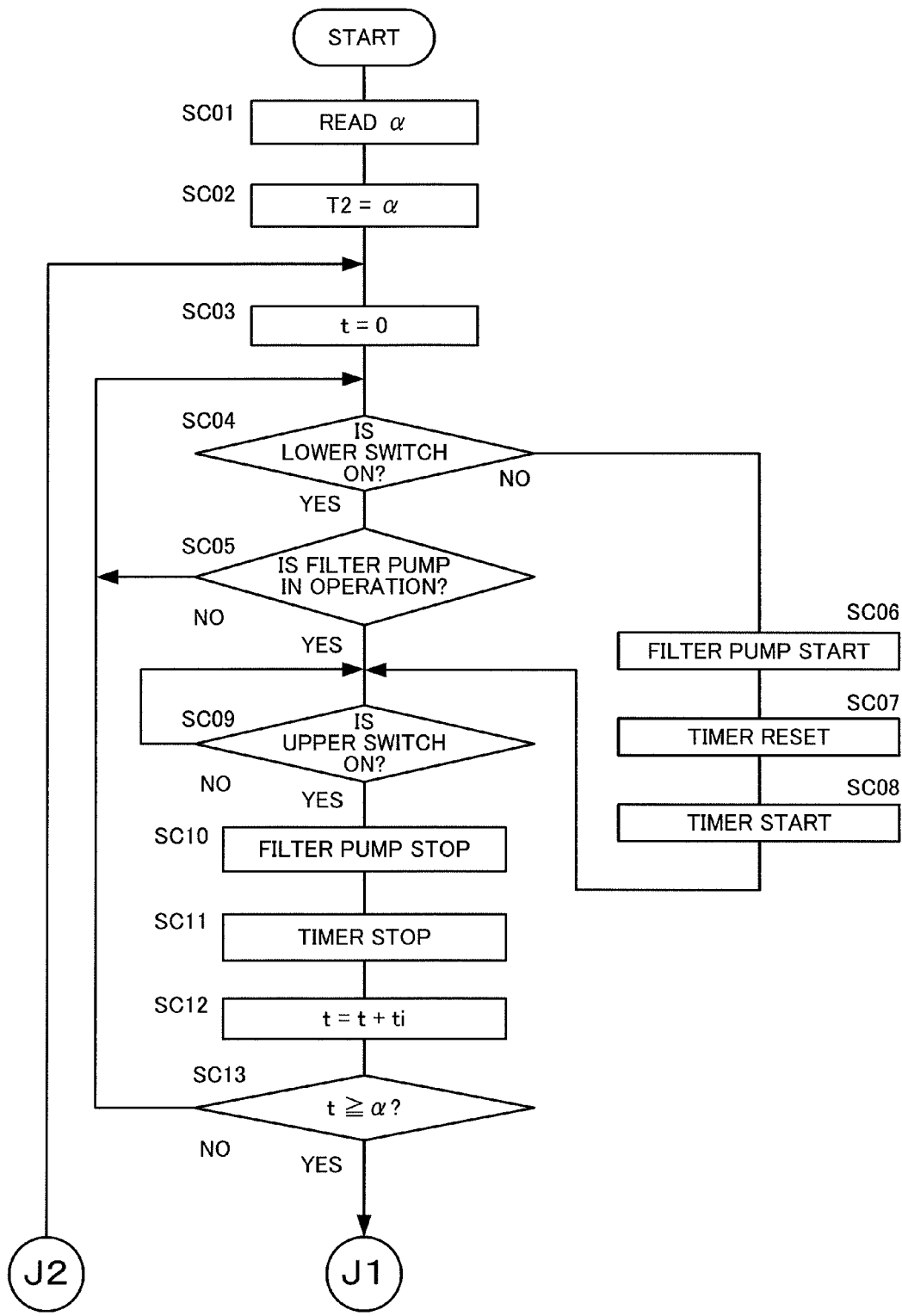
FIGS. 5A and 5B are flowcharts showing a third example of the process of executing the washing of the filter attached to the filter container in the cutting fluid filtering device shown in FIG. 1.
Figure 5B:
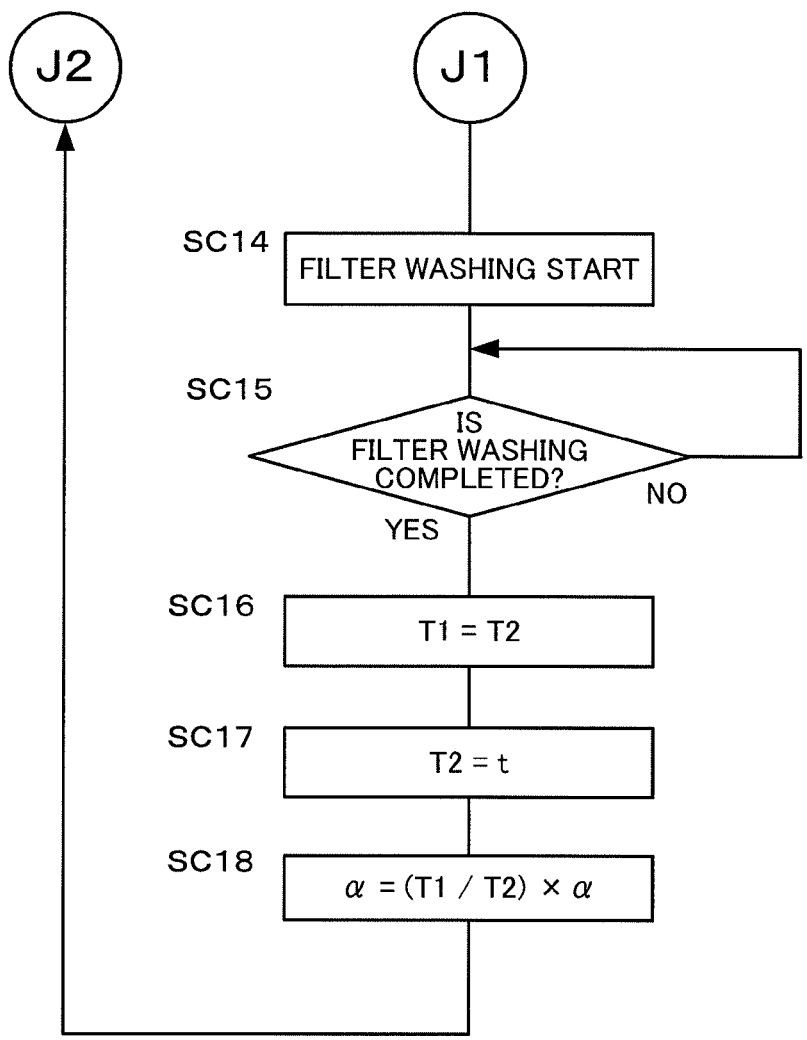

FIGS. 5A and 5B are flowcharts showing a third example of the process of executing the washing of the filter attached to the filter container in the cutting fluid filtering device shown in FIG. 1. In the example of the process, the washing operation interval time α of the filter is changed in response to the fluctuation of the total operation time t of the filter pump between the filter washings (specifically by comparison between the previous total operation time t of the filter pump and the current total operation time t thereof).

In the example of the process, the fluid level height of the filtered cutting fluid in the clean tank 33 in the cutting fluid filtering device 3 is detected by using two proximity sensors of the upper limit detection proximity sensor 52 and the lower limit detection proximity sensor 53. The upper limit fluid level height is detected by the upper limit detection proximity sensor 52, while the lower limit fluid level height is detected by the lower limit detection proximity sensor 53. Hereinbelow, a description will be given according to the following steps.

[Step SC01] The preset washing operation interval time α of the filter is read.

[Step SC02] The initial value of T2 is set to α. T2 indicates the current total operation time of the filter pump.

[Step SC03] The initial value of the total operation time t indicative of the value obtained by totalizing the times during which the filter pump is operated is set to 0.

[Step SC04] It is determined whether or not the lower limit detection proximity sensor 53 (lower switch) is on due to the fluid level height of the filtered cutting fluid in the clean tank and, when the lower switch is on (YES), the process proceeds to Step SC05 and, when the lower switch is off (NO), the process proceeds to Step SC06.

[Step SC05] It is determined whether or not the filter pump is in operation and, when the filter pump is in operation (YES), the process proceeds to Step SC09 and, when the filter pump is not in operation (NO), the process returns to Step SC04.

[Step SC06] The filter pump is activated.

[Step SC07] The timer that measures the drive time of the filter pump is reset.

[Step SC08] The timer is turned on, and the process proceeds to Step SC09.

[Step SC09] It is determined whether or not the upper limit detection proximity sensor 52 (upper switch) is on due to the fluid level height of the filtered cutting fluid in the clean tank and, when the upper switch is on (YES), the process proceeds to Step SC10 and, when the upper switch is off (NO), the process stands by until the upper limit detection proximity sensor 52 is turned on.

[Step SC10] The filter pump is stopped.

[Step SC11] The timer is turned off.

[Step SC12] The total operation time t is updated by adding the time ti measured by the timer that measures the drive time of the filter pump to the total operation time t. The time ti measured by the timer corresponds to the time from the activation of the filter pump in Step SC06 to the stop of the filter pump in Step SC10.

[Step SC13] It is determined whether or not the total operation time t of the filter pump updated (accumulated) in Step SC12 is not shorter than the preset washing operation interval time α of the filter (i.e., t≥α is satisfied) and, when the total operation time t is equal to or longer than the washing operation interval time α (YES), the process proceeds to Step SC14 and, when the total operation time t is shorter than the washing operation interval time α (NO), the process returns to Step SC04.

[Step SC14] The filter washing is started.

[Step SC15] It is determined whether or not the filter washing is completed, and the process proceeds to Step SC16 after the completion of the filter washing.

[Step SC16] The value of T2 is set as the value of T1. T1 indicates the total operation time of the filter pump of the previous time.

[Step SC17] The total operation time t obtained by the calculation in Step SC12 is set as the value of T2.

[Step SC18] The washing operation interval time α of the filter is updated with a value calculated by (T1/T2)×α, and the process returns to Step SC03.

<Fourth Example of Filter Washing>

Figure 6A:
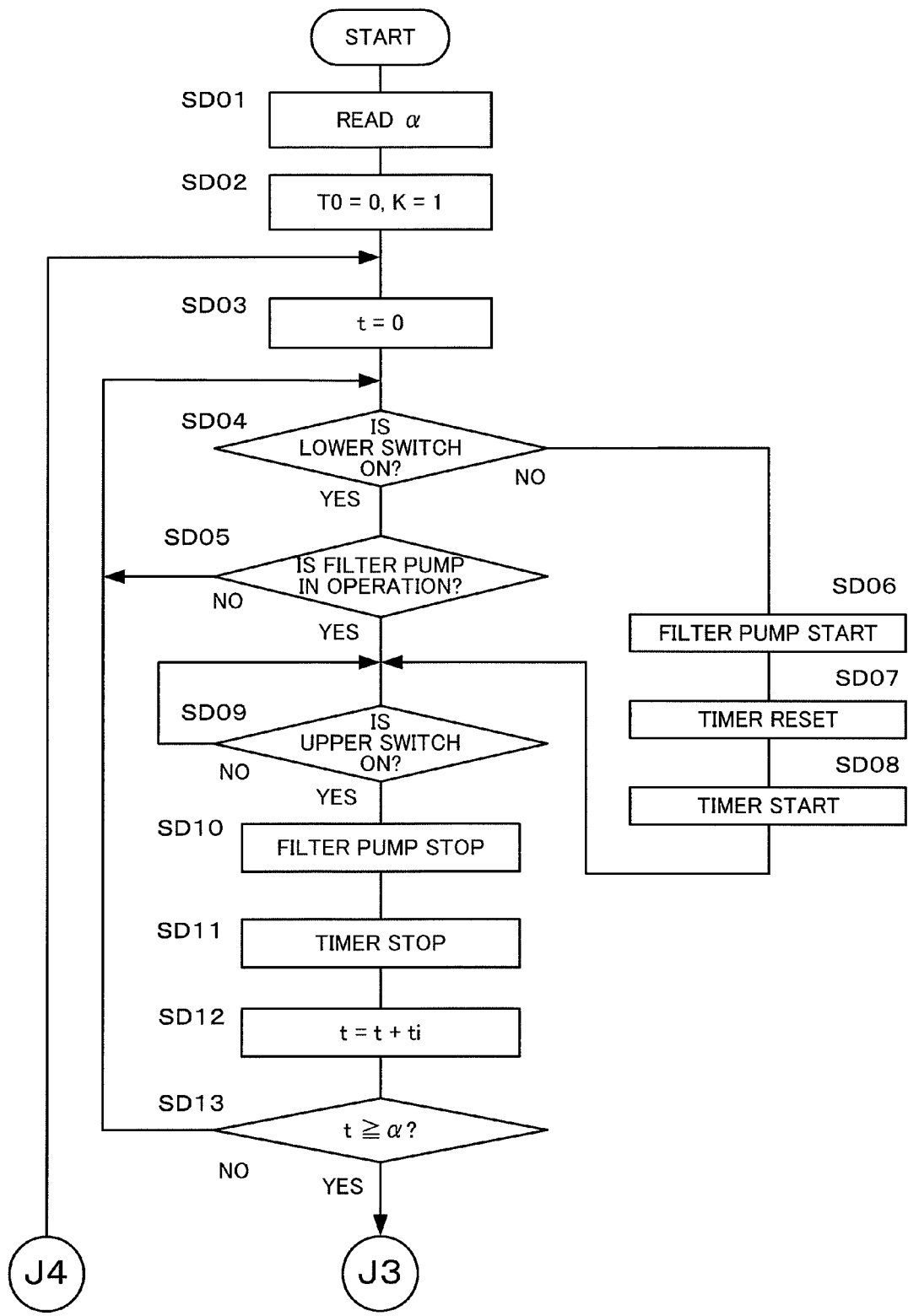
FIGS. 6A and 6B are flowcharts showing a fourth example of the process of executing the washing of the filter attached to the filter container in the cutting fluid filtering device shown in FIG. 1.
Figure 6B:
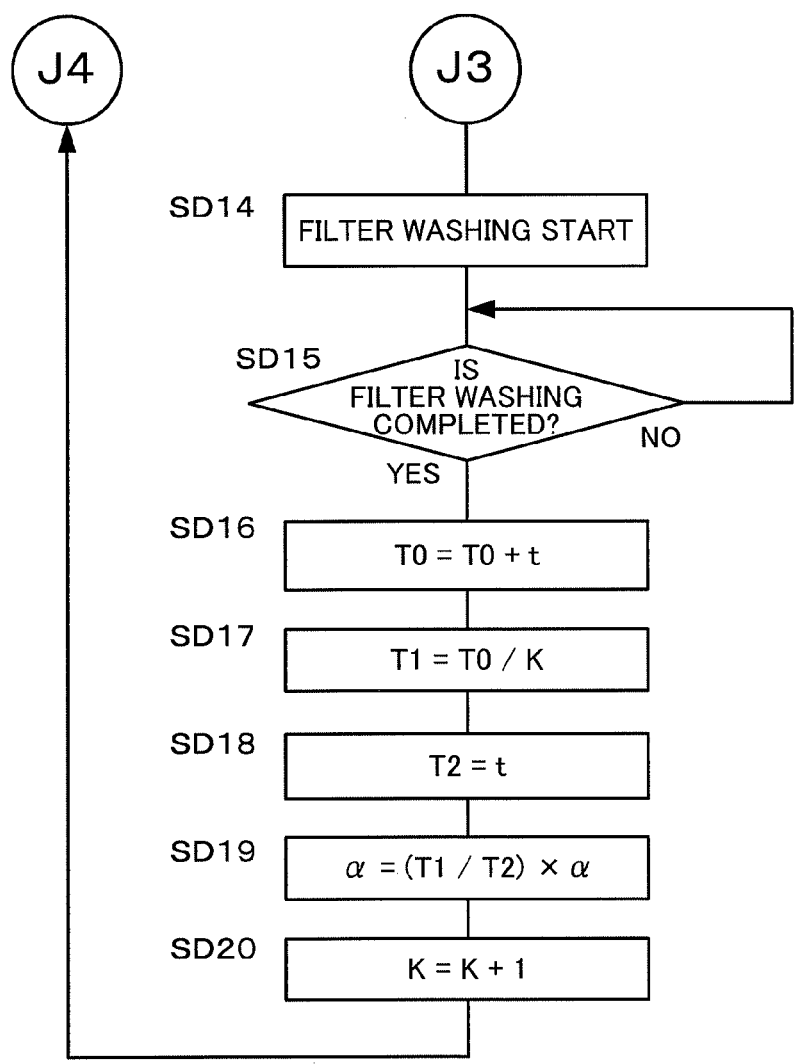

FIGS. 6A and 6B are flowcharts showing a fourth example of the process of executing the washing of the filter attached to the filter container in the cutting fluid filtering device shown in FIG. 1. Hereinbelow, a description will be given according to the following steps. In the example of the process, the washing operation interval time α of the filter is changed in response to the fluctuation of the total operation time t of the filter pump between the filter washings (specifically by comparison between the average value of the past total operation times of the filter pump and the current total operation time thereof).

In the example of the process, the fluid level height of the filtered cutting fluid in the clean tank 33 in the cutting fluid filtering device 3 is detected by using two proximity sensors of the upper limit detection proximity sensor 52 and the lower limit detection proximity sensor 53. The upper limit fluid level height is detected by the upper limit detection proximity sensor 52, while the lower limit fluid level height is detected by the lower limit detection proximity sensor 53. Hereinbelow, a description will be given according to the following steps.

[Step SD01] The preset washing operation interval time α of the filter is read.

[Step SD02] The initial value of T0 is set to 0, and the initial value of K is set to 1. T0 indicates the total sum of the past several total operation times of the filter pump. Note that the number of the past total operation times of the filter pump to be totalized may be a predetermined number. The index K indicates the number of times of the filter washing.

[Step SD03] The initial value of the total operation time t indicative of the value obtained by totalizing the times during which the filter pump is driven is set to 0.

[Step SD04] It is determined whether or not the lower limit detection proximity sensor 53 (lower switch) is on due to the fluid level height of the filtered cutting fluid in the clean tank and, when the lower switch is on (YES), the process proceeds to Step SD05 and, when the lower switch is off (NO), the process proceeds to Step SD06.

[Step SD05] It is determined whether or not the filter pump is in operation and, when the filter pump is in operation (YES), the process proceeds to Step SD09 and, when the filter pump is not in operation (NO), the process returns to Step SD04.

[Step SD06] The filter pump is activated.

[Step SD07] The timer that measures the drive time of the filter pump is reset.

[Step SD08] The timer is turned on, and the process proceeds to Step SD09.

[Step SD09] It is determined whether or not the upper limit detection proximity sensor 52 (upper switch) is on due to the fluid level height of the filtered cutting fluid in the clean tank and, when the upper switch is on (YES), the process proceeds to Step SD10 and, when the upper switch is off (NO), the process stands by until the upper limit detection proximity sensor 52 is turned on.

[Step SD10] The filter pump is stopped.

[Step SD11] The timer is turned off.

[Step SD12] The total operation time t is updated by adding the time ti measured by the timer that measures the drive time of the filter pump to the total operation time t. The time ti measured by the timer corresponds to the time from the activation of the filter pump in Step SD06 to the stop of the filter pump in Step SD10.

[Step SD13] It is determined whether or not the total operation time t of the filter pump updated (accumulated) in Step SD12 is not shorter than the preset washing operation interval time α of the filter (i.e., t≥α is satisfied) and, when the total operation time t is equal to or longer than the washing operation interval time α (YES), the process proceeds to Step SD14 and, when the total operation time t is shorter than the washing operation interval time a (NO), the process returns to Step SD04.

[Step SD14] The filter washing is started.

[Step SD15] It is determined whether or not the filter washing is completed, and the process proceeds to Step SD16 after the completion of the filter washing.

[Step SD16] The value of T0 is updated by adding the total operation time t obtained by the calculation in Step SD12 to the value of T0.

[Step SD17] A value obtained by dividing the updated value of T0 by the number of times of the washing K is set as an average total operation time T1 (i.e., T1=T0/K).

[Step SD18] The total operation time t obtained by the calculation in Step SD12 is set as the value of the current total operation time T2 of the filter pump.

[Step SD19] The washing operation interval time α of the filter is updated with a value calculated by (T1/T2)×α.

[Step SD20] The number of times of the filter washing K is updated by increasing the number of times of the filter washing K by 1, and the process returns to Step SD03.

<Fifth Example of Filter Washing>

Figure 7:
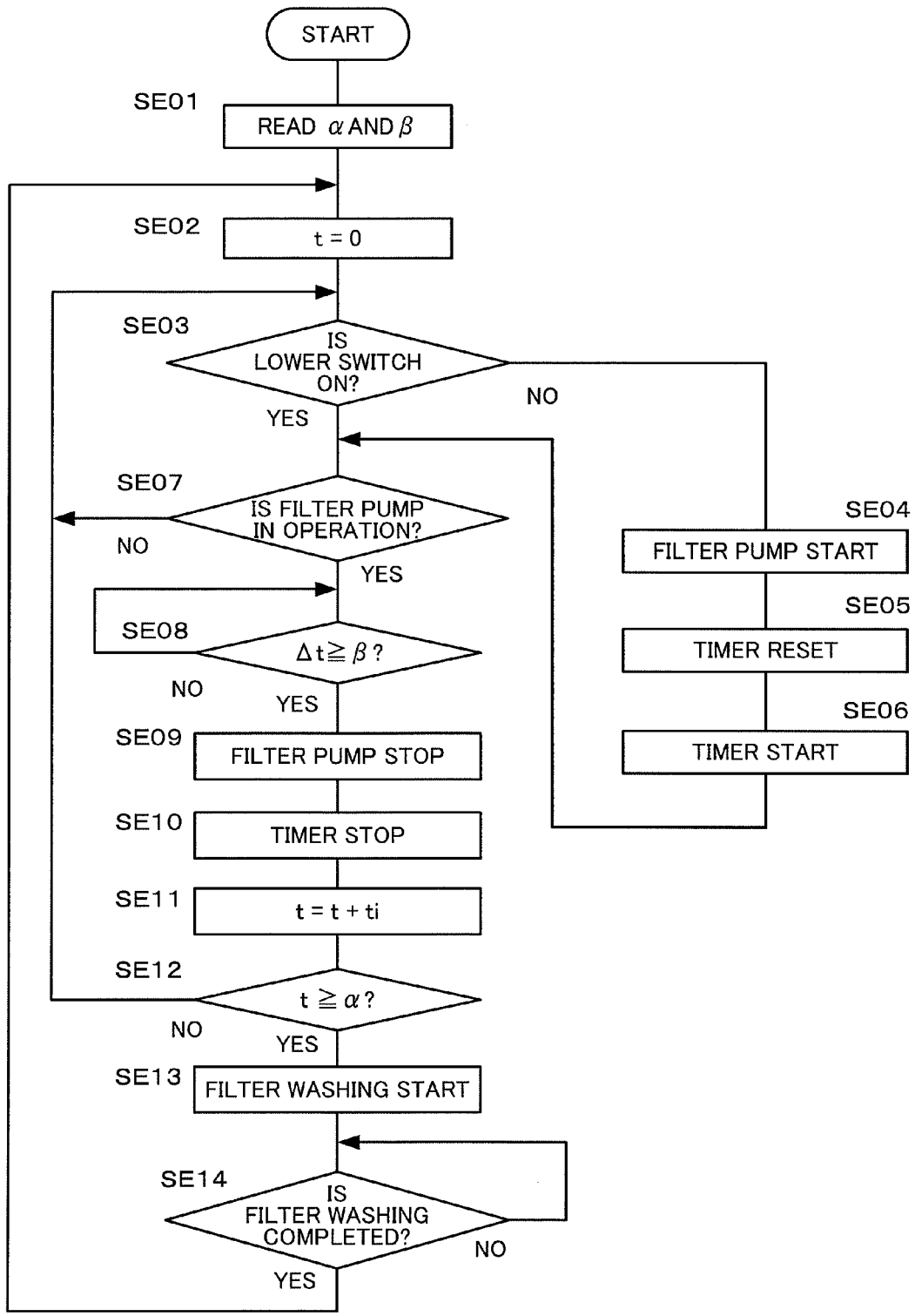
FIG. 7 is a flowchart showing a fifth example of the process of executing the washing of the filter attached to the filter container in the cutting fluid filtering device shown in FIG. 1.

FIG. 7 is a flowchart showing a fifth example of the process of executing the washing of the filter attached to the filter container in the cutting fluid filtering device shown in FIG. 1. In the example of the process, the filter pump is activated when the fluid level height of the filtered cutting fluid in the clean tank is lower than the lower limit position, and the filter pump is stopped after the filter pump is driven for a predetermined time. Hereinbelow, a description will be given according to the following steps.

[Step SE01] The preset washing operation interval time α of the filter and a preset predetermined time β during which the filter pump is driven are read.

[Step SE02] The initial value of the total operation time t indicative of the value obtained by totalizing the times during which the filter pump is driven is set to 0.

[Step SE03] It is determined whether or not the lower limit detection proximity sensor 53 (lower switch) is on due to the fluid level height of the filtered cutting fluid in the clean tank and, when the lower switch is on (YES), the process proceeds to Step SE07 and, when the lower switch is off (NO), the process proceeds to Step SE04.

[Step SE04] The filter pump is activated.

[Step SE05] The timer that measures the drive time of the filter pump is reset.

[Step SE06] The timer is turned on, and the process proceeds to Step SE07.

[Step SE07] It is determined whether or not the filter pump is in operation and, when the filter pump is in operation (YES), the process proceeds to Step SE08 and, when the filter pump is not in operation (NO), the process returns to Step SE03.

[Step SE08] It is determined whether or not the drive time ti during which the filter pump is driven exceeds the predetermined time and, when the drive time ti exceeds the predetermined time (inclusive of the case where the drive time ti is equal to the predetermined time) (YES), the process proceeds to Step SE09 and, when the drive time ti does not exceed the predetermined time, the process proceeds to Step SE09 after the drive time ti exceeds the predetermined time.

[Step SE09] The filter pump is stopped.

[Step SE10] The timer is turned off.

[Step SE11] The total operation time t is updated by adding the time ti measured by the timer that measures the drive time of the filter pump to the total operation time t. The time ti measured by the timer corresponds to the time from the activation of the filter pump in Step SE04 to the stop of the filter pump in Step SE09.

[Step SE12] It is determined whether or not the total operation time t of the filter pump updated (accumulated) in Step SE11 is not shorter than the preset washing operation interval time α of the filter (i.e., t≥α is satisfied) and, when the total operation time t is equal to or longer than the washing operation interval time α (YES), the process proceeds to Step SE13 and, when the total operation time t is shorter than the washing operation interval time α (NO), the process returns to Step SE03.

[Step SE13] The filter washing is started.

[Step SE14] It is determined whether or not the filter washing is completed, and the process returns to Step SE02 after the completion of the filter washing.

<Sixth Example of Filter Washing>

Figure 8A:
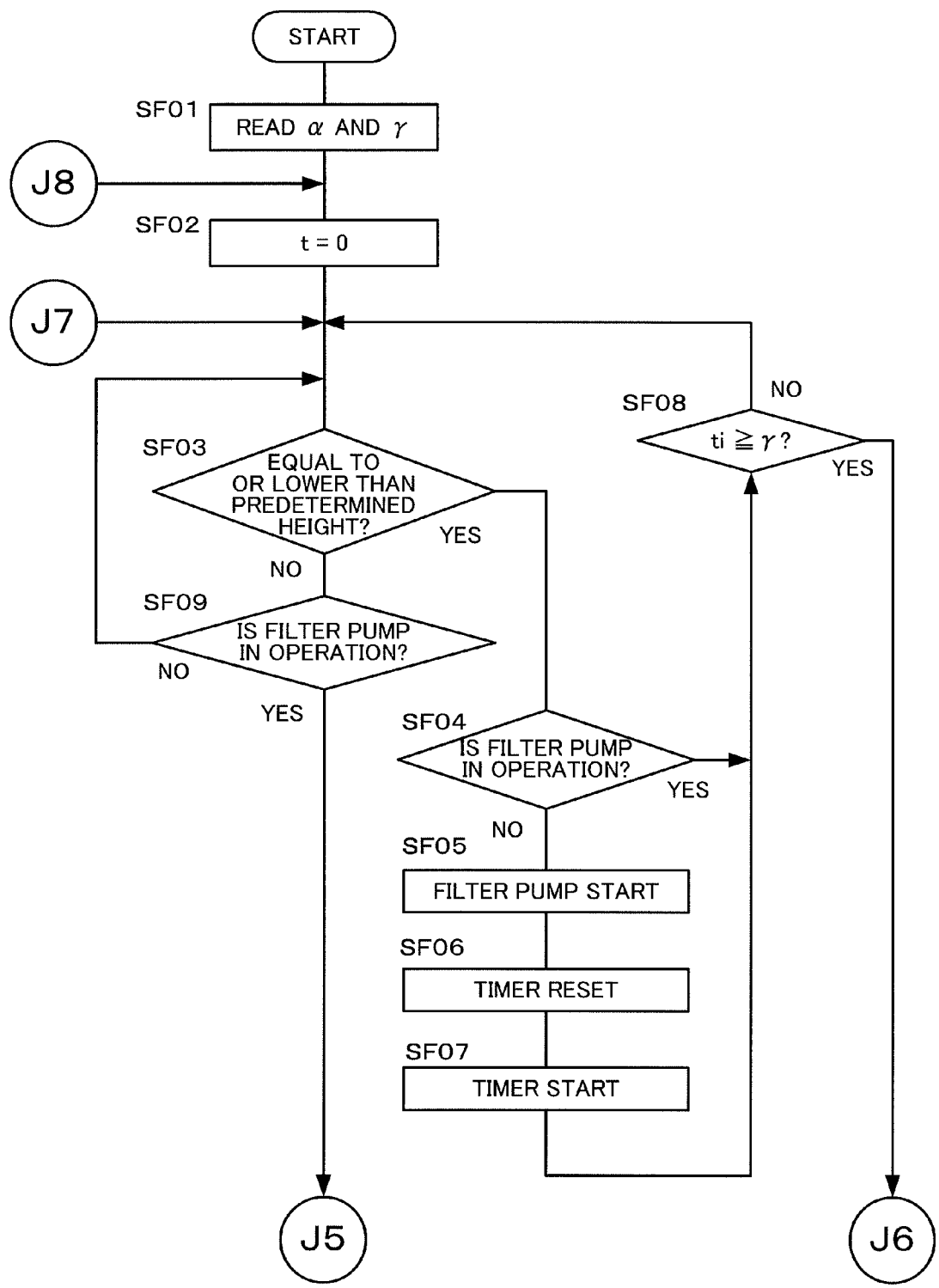
FIGS. 8A and 8B are flowcharts showing a sixth example of the process of executing the washing of the filter attached to the filter container in the cutting fluid filtering device shown in FIG. 1.
Figure 8B:
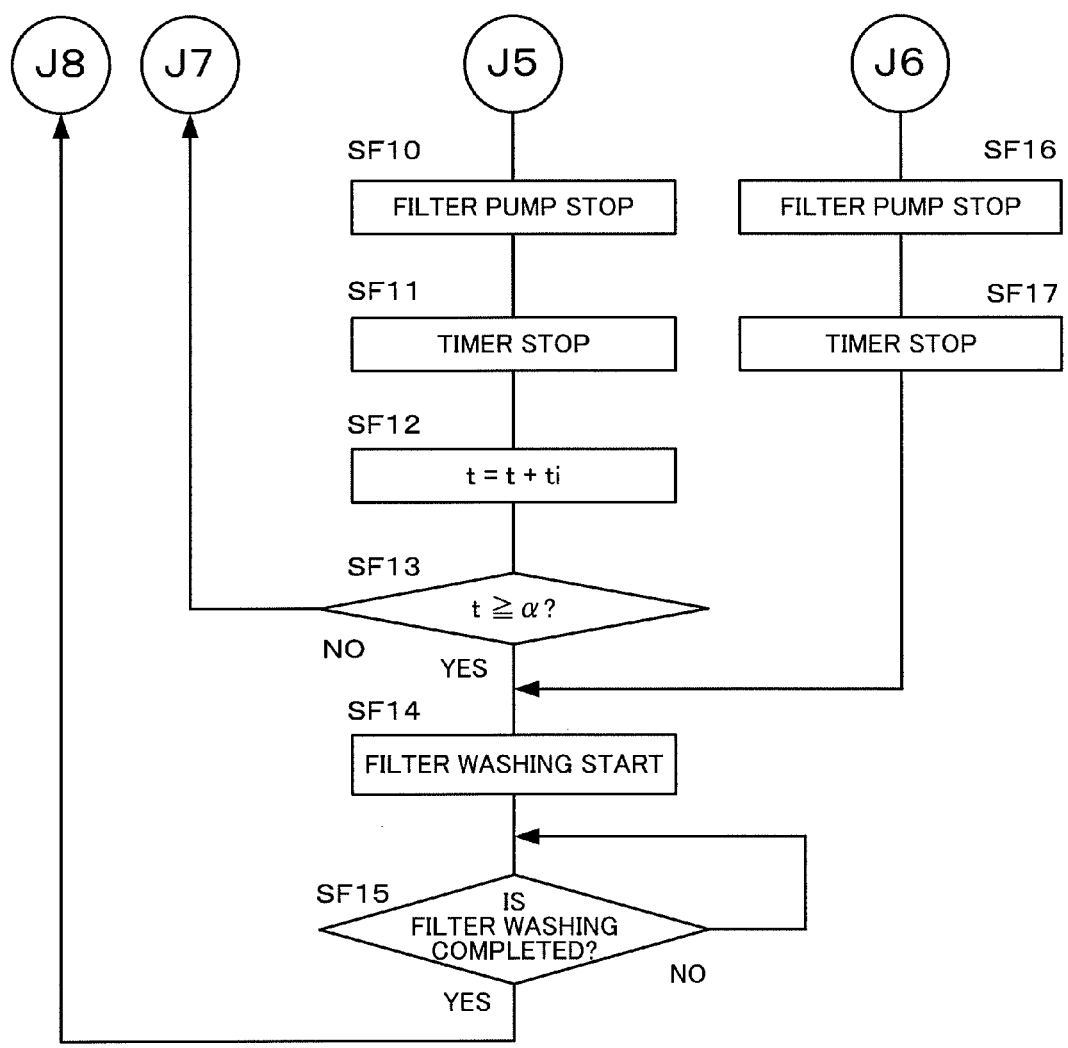

FIGS. 8A and 8B are flowcharts showing a sixth example of the process of executing the washing of the filter attached to the filter container in the cutting fluid filtering device shown in FIG. 1. In the example of the process, when a time during which the fluid level height of the filtered cutting fluid in the clean tank is not higher than a predetermined height becomes equal to or longer than a specific time, the filter washing is executed. Hereinbelow, a description will be given according to the following steps.

[Step SF01] The preset washing operation interval time α of the filter and a present first specific time γ during which the filter pump is driven are read.

[Step SF02] The initial value of the total operation time t indicative of the value obtained by totalizing the times during which the filter pump is driven is set to 0.

[Step SF03] It is determined whether or not the fluid level height of the filtered cutting fluid in the clean tank is not higher than the predetermined height and, when the fluid level height thereof is not higher than the predetermined height (YES), the process proceeds to Step SF04 and, when the fluid level height thereof is higher than the predetermined height (NO), the process proceeds to Step SF09. Note that the fluid level height of the cutting fluid can be detected by using a detection signal from a fluid level position detection sensor.

[Step SF04] It is determined whether or not the filter pump is in operation and, when the filter pump is in operation (YES), the process proceeds to Step SF08 and, when the filter pump is not in operation (NO), the process proceeds to Step SF05.

[Step SF05] The filter pump is activated.

[Step SF06] The timer that measures the drive time of the filter pump is reset.

[Step SF07] The timer is turned on.

[Step SF08] It is determined whether or not the drive time ti of the filter pump is not shorter than the first specific time γ and, when the drive time ti is not shorter than the first specific time γ (YES), the process proceeds to Step SF16 and, when the drive time ti is shorter than the first specific time γ (NO), the process proceeds to Step SF03. Herein, the drive time ti of the filter pump being not shorter than the first specific time γ (the determination of YES in Step SF08) means, e.g., that the adhesion of the impurity such as the chip or the like to the filter is sharply increased and the ability to filter the cutting fluid containing the impurity is sharply lowered. In this example of the filter washing, by grasping this state, it is possible to prevent the machine tool from being adversely affected in a case where the filtered cutting fluid in the clean tank becomes insufficient and the filtered cutting fluid cannot be supplied to the machine tool.

[Step SF09] It is determined whether or not the filter pump is in operation and, when the filter pump is in operation (YES), the process proceeds to Step SF10 and, when the filter pump is not in operation (NO), the process returns to Step SF03.

[Step SF10] It is determined in Step SF03 that the fluid level of the filtered cutting fluid in the clean tank is higher than the predetermined height, and hence the filter pump is stopped.

[Step SF11] The timer is turned off.

[Step SF12] The total operation time t is updated by adding the time ti measured by the timer that measures the drive time of the filter pump to the total operation time t. The time ti measured by the timer corresponds to the time from the activation of the filter pump in Step SF05 to the stop of the filter pump in Step SF10.

[Step SF13] It is determined whether or not the total operation time t of the filter pump updated (accumulated) in Step SF12 is not shorter than the preset washing operation interval time $\alpha$ of the filter (i.e., $t \geq \alpha$ is satisfied) and, when the total operation time t is equal to or longer than the washing operation interval time $\alpha$ (YES), the process proceeds to Step SF14 and, when the total operation time t is shorter than the washing operation interval time $\alpha$ (NO), the process returns to Step SF03.

[Step SF14] The filter washing is started.

[Step SF15] It is determined whether or not the filter washing is completed, and the process returns to Step SF02 after the completion of the filter washing.

[Step SF16] It is determined in Step SF08 that the filter pump is continuously driven for the first specific time $\gamma$ or more (due to lowering of the filtering ability of the filter), and hence the filter pump is stopped.

[Step SF17] The timer is turned off and the process proceeds to Step SF14.

<Seventh Example of Filter Washing>

Figure 9A:
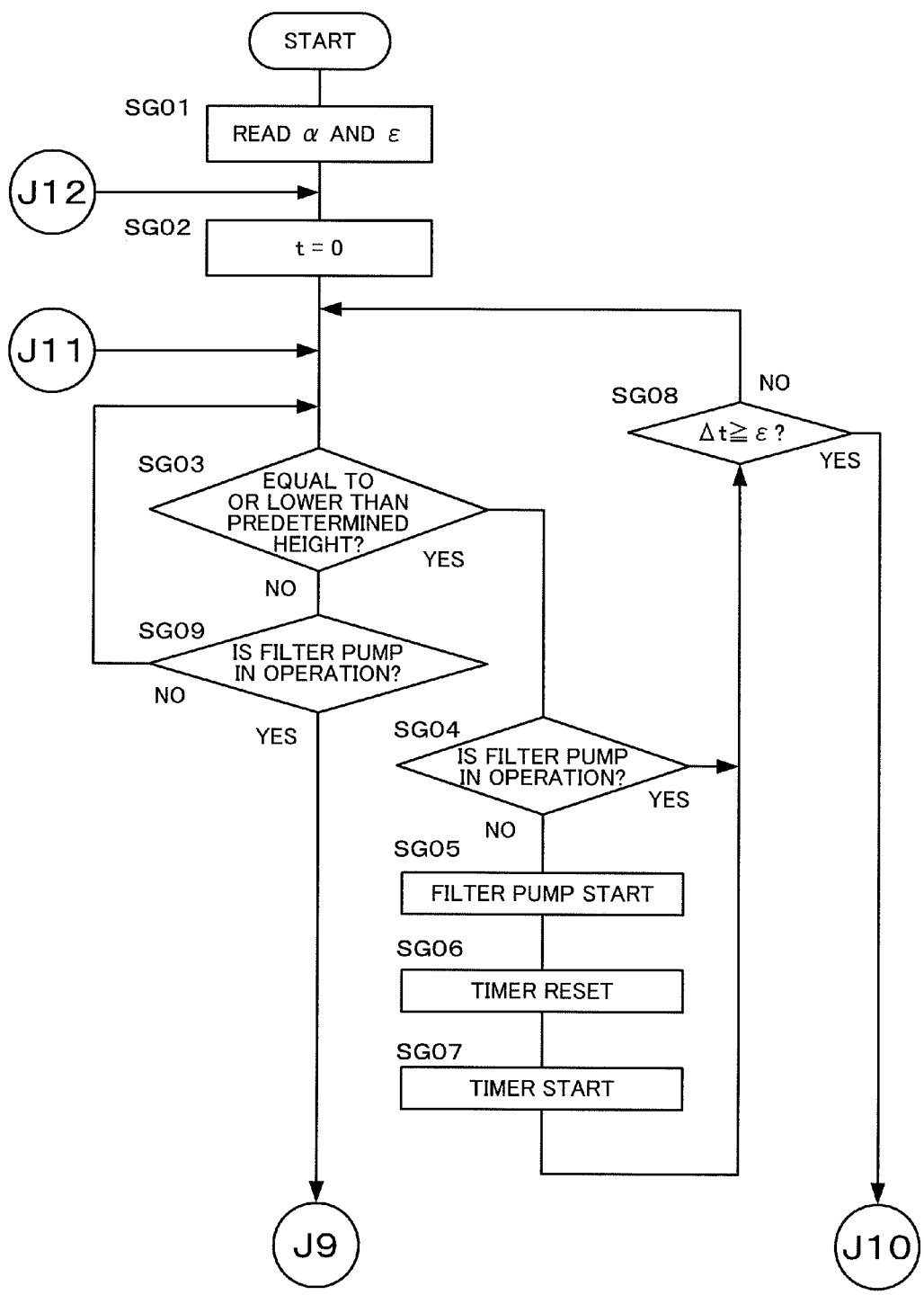
FIGS. 9A and 9B are flowcharts showing a seventh example of the process of executing the washing of the filter attached to the filter container in the cutting fluid filtering device shown in FIG. 1.
Figure 9B:
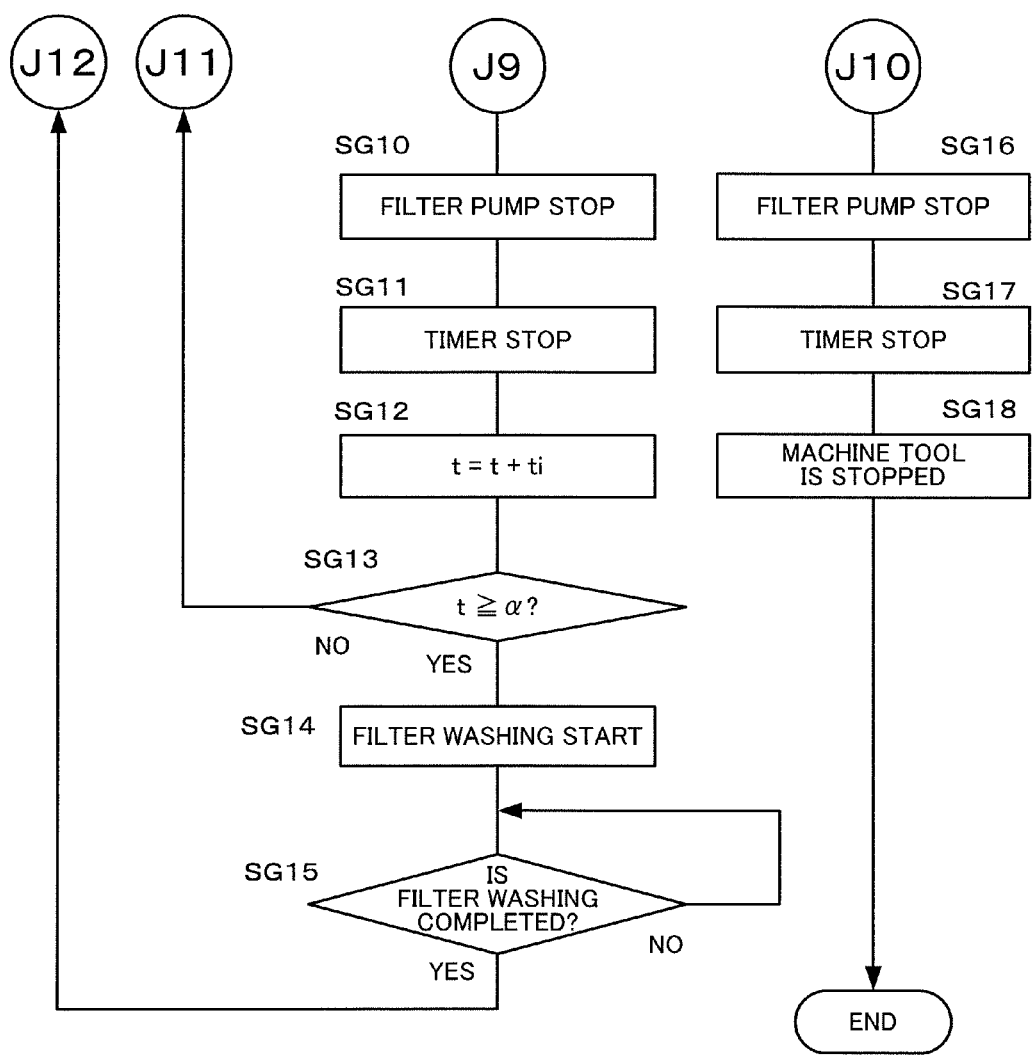
Figure 10:
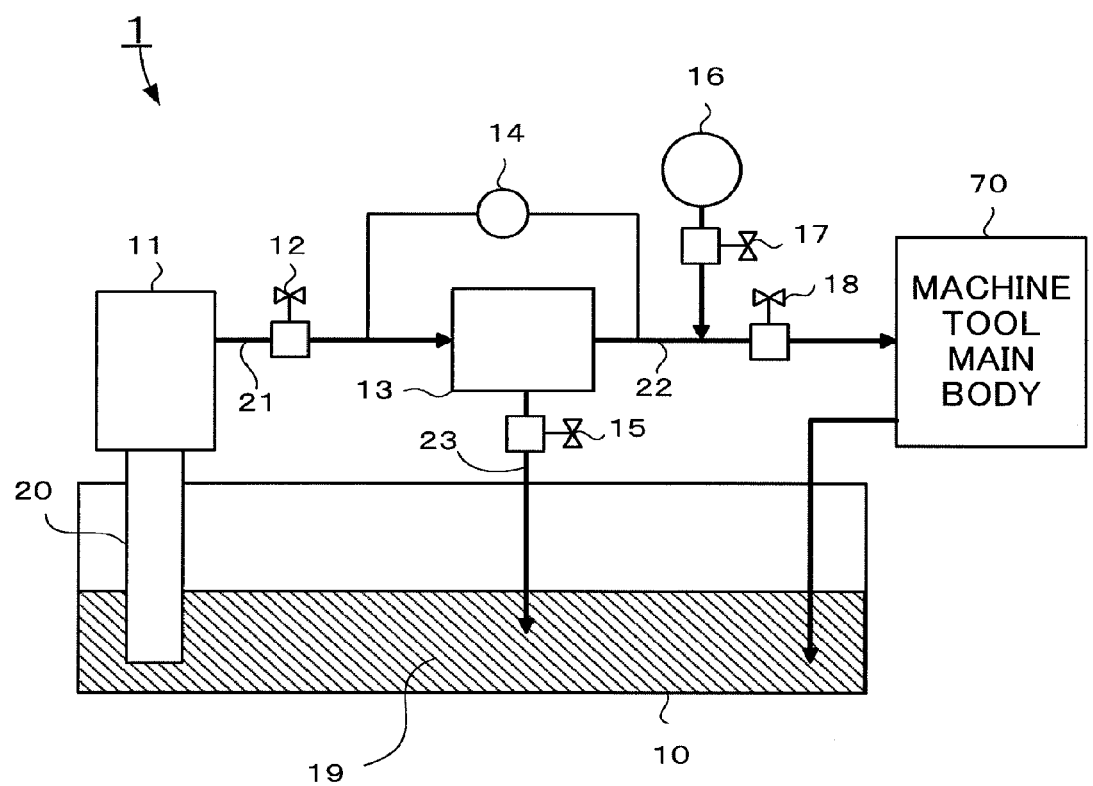
FIG. 10 is a view illustrating a conventional cutting fluid filtering device.

FIGS. 9A and 9B are flowcharts showing a seventh example of the process of executing the washing of the filter attached to the filter container in the cutting fluid filtering device shown in FIG. 1. In the example of the process, when a time during which the fluid level height of the filtered cutting fluid in the clean tank is not higher than a predetermined height becomes equal to or longer than a specific time, the machine tool is stopped. Hereinbelow, a description will be given according to the following steps.

[Step SG01] The preset washing operation interval time $\alpha$ of the filter and a preset second specific times during which the filter pump is driven are read.

[Step SG02] The initial value of the total operation time t indicative of the value obtained by totalizing the times during which the filter pump is driven is set to 0.

[Step SG03] It is determined whether or not the fluid level height of the filtered cutting fluid in the clean tank is not higher than the predetermined height and, when the fluid level height thereof is not higher than the predetermined height (YES), the process proceeds to Step SG04 and, when the fluid level height thereof is higher than the predetermined height (NO), the process proceeds to Step SG09. Note that the fluid level height of the cutting fluid can be detected by using the detection signal from the fluid level position detection sensor.

[Step SG04] It is determined whether or not the filter pump is in operation and, when the filter pump is in operation (YES), the process proceeds to Step SG08 and, when the filter pump is not in operation (NO), the process proceeds to Step SG05.

[Step SG05] The filter pump is activated.

[Step SG06] The timer that measures the drive time of the filter pump is reset.

[Step SG07] The timer is turned on.

[Step SG08] It is determined whether or not the drive time ti of the filter pump is not shorter than the second specific time $\epsilon$ and, when the drive time ti is not shorter than the second specific time $\epsilon$ (YES), the process proceeds to Step SG16 and, when the drive time ti is shorter than the second specific time $\epsilon$ (NO), the process proceeds to Step SG03. Herein, the drive time ti of the filter pump being not shorter than the second specific time $\epsilon$ (the determination of YES in Step SG08) means, e.g., that the adhesion of the impurity such as the chip or the like to the filter is sharply increased and the ability to filter the cutting fluid containing the impurity is sharply lowered. In this example of the filter washing, by grasping this state, it is possible to prevent the machine tool from being adversely affected in a case where the filtered cutting fluid in the clean tank becomes insufficient and the filtered cutting fluid cannot be supplied to the machine tool.

[Step SG09] It is determined whether or not the filter pump is in operation and, when the filter pump is in operation (YES), the process proceeds to Step SG10 and, when the filter pump is not in operation (NO), the process returns to Step SG03.

[Step SG10] It is determined in Step SG03 that the fluid level of the filtered cutting fluid in the clean tank is higher than the predetermined height, and hence the filter pump is stopped.

[Step SG11] The timer is turned off.

[Step SG12] The total operation time t is updated by adding the time ti measured by the timer that measures the drive time of the filter pump to the total operation time t. The time ti measured by the timer corresponds to the time from the activation of the filter pump in Step SG05 to the stop of the filter pump in Step SG10.

[Step SG13] It is determined whether or not the total operation time t of the filter pump updated (accumulated) in Step SG12 is not shorter than the preset washing operation interval time $\alpha$ of the filter (i.e., $t \geq \alpha$ is satisfied) and, when the total operation time t is equal to or longer than the washing operation interval time $\alpha$ (YES), the process proceeds to Step SG14 and, when the total operation time t is shorter than the washing operation interval time $\alpha$ (NO), the process returns to Step SG03.

[Step SG14] The filter washing is started.

[Step SG15] It is determined whether or not the filter washing is completed, and the process returns to Step SG02 after the completion of the filter washing.

[Step SG16] It is determined in Step SG08 (as a result of lowered filtering ability) that the filter pump is continuously driven for the second specific time $\epsilon$ or more, and hence the filter pump is stopped.

[Step SG17] The timer is turned off.

[Step SG18] The machine tool is stopped and the process is ended. The stop of the machine tool is performed by sending a stop instruction to the numerical controller (not shown) that controls the machine tool main body 70 from the controller 60 of the cutting fluid filtering device 3.

What is claimed is:
1. A cutting fluid filtering device comprising:
 a dirty tank that stores a cutting fluid used when a workpiece is machined by using a machine tool;
 a filter that filters out an impurity contained in the cutting fluid;
 a pump that supplies the cutting fluid to the filter;
 a clean tank that stores the cutting fluid filtered by the filter; and a filter washing function that washes off the impurity caught by the filter, the cutting fluid filtering device further comprising:

two fluid level detectors that detect a lower limit position and upper limit position of the cutting fluid stored in the clean tank;

a pump control unit that drives the pump when it is detected that the fluid level of the cutting fluid is lower than the lower limit position and supplies the cutting fluid to the filter, and stops the pump when it is detected that the fluid level of the cutting fluid is at the upper limit position, by the two fluid level detectors;

a pump operation time totalization unit that totalizes an operation time of the pump;

a washing instruction unit that compares a total time calculated in the pump operation time totalization unit with a preset washing operation interval time of the filter, and issues an instruction to execute washing of the filter when the total time becomes equal to or longer than the washing operation interval time;

a total time storage unit that stores the total time during which the pump is operated from completion of the washing of the filter to execution of the next washing; and a washing operation interval time adjustment unit that compares the total time newly calculated by the pump operation time totalization unit after the washing of the filter with the total time stored in the total time storage unit before the washing of the filter, and reduces the washing operation interval time of the filter when the newly calculated total time is longer than the total time before the washing of the filter and increases the washing operation interval time of the filter when the newly calculated total time is shorter than the total time before the washing of the filter.

2. The cutting fluid filtering device according to claim 1, wherein the washing of the filter is performed when a time during which the fluid level detected by the fluid level detector is not higher than a predetermined height becomes equal to or longer than a specific time.

3. The cutting fluid filtering device according to claim 1, wherein the machine tool is stopped when a time during which the fluid level detected by the fluid level detector is not higher than a predetermined height becomes equal to or longer than a specific time.

4. A cutting fluid filtering device comprising:

a dirty tank that stores a cutting fluid used when a workpiece is machined by using a machine tool;

a filter that filters out an impurity contained in the cutting fluid;

a pump that supplies the cutting fluid to the filter;

a clean tank that stores the cutting fluid filtered by the filter; and a filter washing function that washes off the impurity caught by the filter, the cutting fluid filtering device further comprising:

two fluid level detectors that detect a lower limit position and upper limit position of the cutting fluid stored in the clean tank;

a pump control unit that drives the pump when it is detected that the fluid level of the cutting fluid is lower than the lower limit position and supplies the cutting fluid to the filter, and stops the pump when it is detected that the fluid level of the cutting fluid is at the upper limit position, by the two fluid level detectors;

a pump operation time totalization unit that totalizes an operation time of the pump;

a washing instruction unit that compares a total time calculated in the pump operation time totalization unit with a preset washing operation interval time of the filter, and issues an instruction to execute washing of the filter when the total time becomes equal to or longer than the washing operation interval time;

a total time storage unit that stores the total time during which the pump is operated from completion of the washing of the filter to execution of the next washing; and a washing operation interval time adjustment unit that compares the total time newly calculated by the pump operation time totalization unit with an average value of the total times previously calculated a plurality of times by the pump operation time totalization unit, and reduces the washing operation interval time when the newly calculated total time is longer than the average value of the total times and increases the washing operation interval time when the newly calculated total time is shorter than the average value of the total times.

5. The cutting fluid filtering device according to claim 4, wherein the washing of the filter is performed when a time during which the fluid level detected by the fluid level detector is not higher than a predetermined height becomes equal to or longer than a specific time.

6. The cutting fluid filtering device according to claim 4, wherein the machine tool is stopped when a time during which the fluid level detected by the fluid level detector is not higher than a predetermined height becomes equal to or longer than a specific time.

* * * * *